United States Patent
Hayashi et al.

[11] Patent Number: 5,286,428
[45] Date of Patent: Feb. 15, 1994

[54] POLYPROPYLENE RESIN FOAMED SHEET FOR THERMOFORMING AND PROCESS FOR PRODUCING THE SAME

[75] Inventors: Motoshige Hayashi; Tsuneo Doi; Kiyotaka Matsuoka, all of Nara, Japan

[73] Assignee: Sekisui Kaseihin Kogyo Kabushiki Kaisha, Nara, Japan

[21] Appl. No.: 671,637

[22] Filed: Mar. 20, 1991

Related U.S. Application Data

[63] Continuation of Ser. No. 257,619, Oct. 14, 1988, abandoned.

[30] Foreign Application Priority Data

Oct. 16, 1987 [JP] Japan .................. 62-259458

[51] Int. Cl.⁵ .............................. B29C 67/22
[52] U.S. Cl. ...................... 264/45.3; 264/51; 264/146; 264/159
[58] Field of Search ............ 264/235, 146, 45.3, 264/51, 159, 544; 428/317.9, 312.2

[56] References Cited

U.S. PATENT DOCUMENTS

| | | | |
|---|---|---|---|
| 3,223,764 | 12/1965 | Kuhn et al. | 264/235 |
| 3,394,045 | 7/1968 | Gould | 264/235 |
| 3,649,731 | 3/1972 | Cronin | 264/45.3 |
| 3,893,957 | 7/1975 | Mixon et al. | 264/45.3 |
| 3,927,159 | 12/1975 | Tomikawa et al. | 264/45.3 |
| 4,054,550 | 10/1977 | Parker et al. | 264/45.3 |
| 4,111,860 | 9/1978 | Jack | 264/45.3 |
| 4,146,451 | 3/1979 | Schirmer | 264/54 |
| 4,206,166 | 6/1980 | Hayashi et al. | 264/54 |
| 4,426,065 | 1/1984 | Komatsuzaki et al. | 264/45.9 |
| 4,440,703 | 4/1984 | Akiyama et al. | 264/53 |
| 4,459,250 | 7/1984 | Miura et al. | 264/45.9 |
| 4,475,039 | 10/1984 | Borst et al. | 425/397 |
| 4,525,317 | 6/1985 | Okada et al. | 264/235.8 |
| 4,657,715 | 4/1987 | Myers et al. | 264/45.9 |
| 4,680,157 | 7/1987 | Fujii et al. | 264/235 |
| 4,719,039 | 1/1988 | Leonardi | 264/45.3 |

FOREIGN PATENT DOCUMENTS

| | | | |
|---|---|---|---|
| 53-002904 | 2/1978 | Japan | 264/45.9 |
| 58-171925 | 10/1983 | Japan | 264/45.3 |
| 60-141728 | 7/1985 | Japan | |

Primary Examiner—Allan R. Kuhns
Attorney, Agent, or Firm—Nikaido, Marmelstein, Murray & Oram

[57] ABSTRACT

A polypropylene resin foamed sheet for thermoforming having compounded therein an inorganic fine powder is disclosed. The sheet contains 10 to 50% by weight of the inorganic fine powder, has a density of 0.2 to 1.2 g/cm and a thickness of 0.2 to 3 mm and having a percent shrinkage of 5 to 30% in each of the longitudinal and crosswise directions on heating at 190° C. for 30 minutes, with the ratio of a residual rate in the longitudinal direction to that in the crosswise direction being from 1:0.7 to 1:1.1. The sheet is produced by extruding and foaming a compounded resin from a ring die of an extruder, and taking off the extruded tubular foamed sheet along a cylindrical drum whose diameter is 2.0 to 3.0 times that of said ring die.

5 Claims, 3 Drawing Sheets

POLYPROPYLENE RESIN FOAMED SHEET FOR THERMOFORMING AND PROCESS FOR PRODUCING THE SAME

This application is a continuation of application Ser. No. 257,619 filed Oct. 14, 1988 now abandoned.

FIELD OF THE INVENTION

This invention relates to a polypropylene resin foamed sheet containing a large quantity of an inorganic fine powder which is suitable for thermoforming and to a process for producing the same. More particularly, it relates to a polypropylene resin foamed sheet having excellent deep drawing thermoforming properties and satisfactory properties to keep the pattern printed thereon in a predetermined position upon thermoforming.

BACKGROUND OF THE INVENTION

Known thermoforming foamed sheets include a polystyrene resin foamed sheet containing a large quantity of an inorganic fine powder as disclosed in U.S. Pat. No. 4,426,065 and a polypropylene resin foamed sheet containing a large quantity of an inorganic fine powder as disclosed in JP-A-60-141728 (the term "JP-A" as used herein refers to a "published unexamined Japanese patent application"). Since the polystyrene resin foamed sheet is poor in heat resistance and oil resistance, formed articles such as trays and containers obtained therefrom are incapable of use in a radar range, and the sheet is unsuitable for producing deep draws such as cups. Further, it is poor in impact resistance and tensile strength.

The above-stated polypropylene resin foamed sheet shows improved heat resistance permitting of use in a radar range and improved deep drawing properties as compared with the polystyrene resin foamed sheet. However, when the sheet having printed thereon a prescribed pattern is subjected to thermoforming, the pattern is liable to be shifted or deformed each time it is formed. Further, when the extruded sheet is taken off along a drum, it shows resistance against the cylindrical drum to slow down the take-off speed or cause tearing of the sheet.

SUMMARY OF THE INVENTION

Accordingly, one object of this invention is to provide a polypropylene resin foamed sheet having excellent thermoforming properties including deep drawing properties and formability to complicated shape.

Another object of this invention is to provide a polypropylene resin foamed sheet with a printed pattern which can be thermoformed without shift or deformation of the pattern.

A still another object of this invention is to provide a polypropylene foamed sheet having heat- and oil-resistance enough for use in a radar range.

A yet another object of this invention is to provide a polypropylene resin foamed sheet having excellent mechanical properties including impact resistance, hinge effect, softness, tensile strength, and bending strength.

A further object of this invention is to provide a polypropylene resin foamed sheet having satisfactory printability.

A still further object of this invention is to provide a polypropylene resin foamed sheet which can be handled with a reduced combustion calory after disposal.

A yet further object of this invention is to provide an advantageous process for producing the above-described polypropylene resin foamed sheet which can be carried out in a continuous system by reducing the resistance of an extruded sheet against a cylindrical drum for taking off and cooling.

As a result of extensive and intensive investigations, it has now been found that the above objects of this invention can be accomplished by an extruded foamed sheet of a polypropylene resin compounded with a large quantity of an inorganic fine powder, said sheet having specific thickness, density, and a balance of shrinkage between the longitudinal direction and the crosswise direction and by an extrusion process wherein a cylindrical drum having a twice or three times larger diameter than an extrusion die is used for cooling and taking off. The present invention has been completed based on these findings.

The present invention provides an extruded polypropylene resin foamed sheet for thermoforming having compounded therein from 10 to 50% by weight of an inorganic fine powder, said sheet having a density of from 0.2 to 1.2 $g/cm^3$ and a thickness of from 0.2 to 3 mm and having a percent shrinkage of from 5 to 30% in each of the longitudinal and crosswise directions on heating at 190° C. for 30 minutes, with the ratio of the residual dimension (that is the dimension after shrinkage) in the longitudinal direction to that in the crosswise direction being from 1:0.7 to 1:1.1.

The present invention further provides a process for producing the above-described polypropylene resin foamed sheet for thermoforming which comprises uniformly compounding a polypropylene resin with an inorganic fine powder and extruding and foaming the resin compound, wherein said inorganic fine powder is compounded in an amount of from 10 to 50% by weight based on the polypropylene resin, extruding and foaming the resulting compound from a ring die of an extruder, and cooling the extruded foamed sheet along a cylindrical drum whose diameter is 2.0 to 3.0 times that of said ring die, followed by taking up.

BRIEF DESCRIPTION OF THE ACCOMPANYING DRAWINGS

FIGS. 3(a), (b), (c) and (d) each shows a side view, a developed plan view, a cross-sectional view, and a photograph, respectively, of a doll-shaped container formed from the polypropylene foamed sheet of the invention.

FIGS. 4(a) and (b) each shows a perspective view and a cross-sectional view, respectively, of a lidded container formed from the polypropylene foamed sheet of the invention.

DETAILED DESCRIPTION OF THE INVENTION

The polypropylene resin which can be used in the present invention includes a propylene homopolymer and copolymers mainly comprising propylene, e.g., a propylene-ethylene copolymer, a propylene-ethylene-diene copolymer, etc. A melting point of the propylene homopolymer is 176° C., and that of the propylene copolymer is between 135° C. and 160° C. The higher the melting point, the higher the heat resistance of the resulting foamed sheet. These resins may contain other resins compatible with the polypropylene resin, such as polyethylene and an ethylene-vinyl acetate copolymer, in minor proportions.

The inorganic fine powder to be compounded with the polypropylene resin includes oxides, e.g., silica, diatomaceous earth, alumina, titanium oxide, iron oxide, zinc oxide, magnesium oxide, pumice powder, etc.; hydroxides, e.g., aluminum hydroxide, magnesium hydroxide, basic magnesium carbonate, etc.; carbonates, e.g., calcium carbonate, magnesium carbonate, dolomite, etc.; sulfates or sulfites, e.g., calcium sulfate, barium sulfate, calcium sulfite, etc.; silicates, e.g., talc, clay, mica, asbestos, calcium silicate, montmorillonite, bentonite, etc.; and metallic powders, e.g., powders of aluminum, iron, zinc, etc. These inorganic substances may be used either individually or in combinations of two or more thereof. Particularly preferred of them are talc, calcium carbonate, clay, silica, and alumina each having an average particle size of from 1 to 30 μm.

The amount of the inorganic fine powder to be compounded ranges from 10 to 50% by weight, preferably from 20 to 35% by weight, based on the polypropylene resin. If it is less than 10% by weight, the sheet cannot be sufficiently formed to shape, particularly to complicated shape and, moreover, the calorie required for thermal disposal would be increased. On the other hand, if it exceeds 50% by weight, not only, drawing tolerance of the foamed sheet is reduced, resulting in the failure of deep draw, but the sheet would have reduced mechanical properties, such as impact resistance and hinge strength, poor appearance, and deteriorated printability.

The inorganic fine powder should be uniformly mixed and dispersed in the polypropylene resin. For the purpose of improving compatibility between the resin and the inorganic powder, it is preferable to add a small amount of a silane or titanium coupling agent commonly employed in the art, a surface active agent for dispersion aid, a metallic soap, a polyhydric alcohol, an acid anhydride or the like additive.

Since the foamed sheet of the present invention contains the inorganic powder in such a high proportion as recited, not only the calory required for combusting the waste can be so decreased to facilitate thermal disposal of the waste but also the unit cost of the sheet would be decreased.

A blowing agent which can be used in the present invention includes blowing agents which are gaseous at ambient temperature, e.g., nitrogen gas, carbon dioxide, and air; volatile blowing agents, e.g., water, alcohols, propane, butane, pentane, Freon 11, 12 and 114 (trade names of E.I. Du Pont), methyl chloride, and ethyl chloride; and chemical blowing agents decomposable on heating, e.g., azodicarbonamide, N,N,'-dinitrosopentamethylenetetramine, p,p'-oxybis(benzenesulfonylhydrazide), p,p'-oxybis(benzenesulfonylcarbazide), azobisisobutyronitrile, benzenesulfonyl hydrazide, and a mixture of sodium hydrogencarbonate and citric acid. In the production of the foamed sheet of the present invention, a relatively small amount of these blowing agents would be enough. That is, the blowing agent is usually used in an amount of from 0.5 to 10% by weight, preferably from 0.5 to 2.0%, based on the resin. Further, it is easy to choose hydrocarbon type blowing agents or pyrolysis type blowing agents which do not destroy the ozone layer in stratosphere.

The foamed sheet according to the present invention can generally be produced in a continuous system by the use of an extruder. The polypropylene resin and the inorganic powder are fed to an extruder and heat-melted together with a blowing agent, or the blowing agent is fed to the midway of an extruder and kneaded well with the resin. The resin compound is set at a temperature suited for foaming and forwarded to an extrusion die. The resin temperature at the die is adjusted to 180° C. to 240° C., and the temperature of the die is adjusted at a temperature lower than the resin temperature by 10° to 60° C. The die to be used includes a coathanger die or a T die having a slit whose width is greater than the thickness of the tip and a ring die having a cylindrical form and a ring orifice at the tip thereof. When the former type of die is used, the extruded sheet is cooled by a chill roll while controlling the degree of stretching in the extrusion direction by adjusting the pulling speed and stress. If desired, the stretching in the cross direction can be controlled by clamping. In cases where the latter type of die (ring die) is used, the tubular foamed sheet extruded from the ring orifice is chilled by air blast and also by pulling the sheet around and along a cylindrical drum while controlling the extrusion direction stretch by utilizing the pulling speed and stress and the cross direction stretch by adjusting the diameter of the drum.

The orifice of the ring die usually has a width of from 0.2 to 1.4 mm. A ratio of the diameter of the drum to the diameter of the ring die, i.e., a blow-up ratio, is set in the range of from 2.0 to 3.0. If the blow-up ratio is less than 2.0, it would be difficult to balance the residual dimensions in the extrusion direction (or longitudinal direction) and the crosswise direction after heat shrinkage. Achievement of a blow-up ratio exceeding 3.0 is virtually difficult because of such a large proportion of the compounded inorganic fine powder.

It is preferable that the cylindrical drum be composed of a first or front cylinder and a second or rear cylinder having a slightly smaller diameter than the front cylinder. In this case, the resistance of the tubular foamed sheet to the drum due to shrinkage upon chilling can be lessened whereby the tubular sheet can be pulled more smoothly and taken up more easily around a take-off roll. The thus-increased take-off speed would lead to improvement of productivity.

It is also possible to facilitate introduction of the extruded tubular sheet to the drum by raising the temperature of the front drum.

By controlling the extrusion conditions, such as resin feed, amount of a blowing agent, size of the die orifice, die temperature, blow-up ratio, chilling temperature, pulling speed, and the like, as described above, there can be produced a polypropylene resin foamed sheet having a density of from 0.2 to 1.2 g/cm$^3$ and a thickness of from 0.2 to 3 mm, preferably from 0.2 to 2.0 mm, and having a percent shrinkage of from 5 to 30%, preferably from 10 to 25%, in the longitudinal or crosswise direction on heating at 190° C. for 30 minutes, with the ratio of a residual rate in the longitudinal direction to that in the crosswise direction being from 1:0.7 to 1:1.1.

If the density of the sheet is less than 0.2 g/cm$^3$, sufficient bending strength cannot be obtained even with the thickness increased, and surface smoothness of the sheet is deteriorated, making clear printing difficult. If the density exceeds 1.2 g/cm$^3$, the sheet undergoes sagging by gravity on thermoforming.

If the thickness of the sheet is less than 0.2 mm, such a thin sheet finds difficulty in smoothly introducing itself to the cylindrical drum and is inapplicable as thermoforming material due to its insufficient bending strength. Besides, holes would be formed at the time of preheating before thermoforming. On the other hand, if the thickness exceeds 3.0 mm, the cylindrical drum meets with resistance while the extruded tubular sheet passes on, thus making take-up of the sheet difficult. Further, the sheet fails to have a smooth surface suitable for printing. From the standpoint of ease of take-up, a preferred thickness of the sheet is 2.0 mm or less.

The thermoforming properties, oil resistance and other physical properties of the foamed sheet according to the present invention can further be improved by laminating with a thermoplastic resin film having adhesiveness.

The phrase "on heating at 190° C. for 30 minutes" as used in the present invention means that the resin foamed sheet is heated for 30 minutes at a temperature higher than the melting point of a crystalline polypropylene resin by at least 20° C. Such heating provides a condition that the crystalline structure of the polypropylene resin foamed sheet may entirely disappear and the residual stress may be removed completely. When the foamed sheet is heated under such a condition, if the heat percent shrinkage of the foamed sheet is less than 5%, the sheet undergoes sagging by gravity on preheating in an oven before thermoforming to cause a shift of position for forming. If it is more than 30%, the sheet is incapable of deep drawing. Further, the sheet shrinks on removal from a preheating plate, resulting in removal from a forming tool or the position of the printed pattern may be shifted from the predetermined position.

If the ratio of a residual rate in the longitudinal direction to that in the crosswise direction is less 1:0.7, the positional shift of the printed pattern would be serious to cause unpredictable distortion of the pattern on thermoforming. On the other hand, if the ratio of a residual rate in the longitudinal direction to that in the crosswise direction exceeds 1:1.1, in introducing a tubular polypropylene resin foamed sheet into the drum, the drum meets with resistance, thus making pass along the drum and take-up of the sheet difficult. Furthermore, the clamps at the both ends are left on thermoforming, thus making it difficult to obtain good molded articles.

For the purpose of increasing a printing speed and avoiding dust collection, an antistatic agent may be incorporated into the resin compound or coated thinly on the surface of the sheet to control the surface resistivity within a range of from $10^8$ to $10^{12}$ Ω.

The terminology "surface resistivity" as used herein means a value obtained by measurement 2 weeks after extrusion at 23° C. and 60% RH according to JIS-K 6911.

When the resin foamed sheet for thermoforming is printed with a printing ink to form a pattern, adhesion of the printing ink to the sheet can be ensured by increasing the surface tension of the sheet. To this effect, an index of wettability, indicative of surface tension, of the sheet is preferably increased to 40 dyne/cm or more. Such can be done by incorporating a surface active agent into the resin compound or thinly applying a surface active agent on the surface of the sheet, or by solvent treatment, or desirably by corona discharge treatment or plasma discharge treatment.

The terminology "index of wettability" as used herein means a value obtained by measurement 2 weeks after extrusion at 23° C. and 50% RH in accordance with JIS-K 6768.

The extruded foamed sheet taken off and rolled up can be subjected to thermoforming as such. If desired, the rolled-up sheet may be unrolled, contacted with a hot roll under tension to be flattened, cut to size, and printed. The cut-to-size foamed sheets can be printed by inexpensive offset printing. The foamed sheet exhibits satisfactory receptivity and adhesion to a printing ink and, because of its light weight, does not cause ink offset even when piled up one on another. Further, owing to the antistatic treatment, the sheets are prevented from turning up during high-speed printing so that a pattern can be formed in position and the resulting formings have the printed pattern in position.

The present invention is now illustrated in greater detail with reference to Examples and Comparative Examples, but it should be understood that the present invention is not deemed to be limited thereto. In these examples, all the parts are by weight.

EXAMPLE 1

A mixture of 70 parts of a polypropylene resin (a base resin of "Noblen D501" produced by Sumitomo Chemical Co., Ltd.), 0.1 part of a stabilizer ("BHT" produced by Sumitomo Chemical), and 30 parts of talc having an average particle size of 8 μm was extruded to obtain pellets.

A hundred parts of the pellets were mixed with 1 part of an antistatic agent ("Electrostripper TS-2" produced by Kao Corporation), and the mixture was supplied to an extruder having a cylinder diameter of 65 mm fitted with a ring die having a diameter of 105 mm and an orifice width of 0.45 mm. The cylinder temperature was set at 200° to 230° C., and about 0.5 part of butane was fed to the midway of the cylinder under pressure. The compounded resin was extruded from the orifice and foamed at a resin temperature of 200° C. and a die temperature lower than the resin temperature by about 10° C. The extrusion output is 25 kg/hr. The outer side of the extruded and foamed tubular sheet was cooled with a light wind (1.0 kg/cm$^2$ or less) blown from an air ring provided concentrically with the ring die and at a distance within 20 mm from the die.

The tubular sheet was taken off while cooling along a cylindrical drum which comprised a first (front) cylinder having a front diameter of 240 mm, a rear diameter of 239 mm, and a length of 50 mm and a second (rear)-cylinder having a front diameter of 235 mm, a rear diameter of 234 mm, and a length of 300 mm which were placed side by side in the extrusion direction with a small gap therebetween. The blow-up ratio was 2.29. The cooling temperature of the first cylinder was set higher than that of the second cylinder by about 30° C. so as to lessen the resistance of the sheet. The thus-cooled tubular sheet was cut open along the extrusion direction with a cutter fitted to the rear end of the second cylinder and then taken up in the form of roll. The resulting web of resin foamed sheet had a thickness of 0.74 mm, a width of 750 mm, and a density of 0.73 g/cm$^3$.

A 100-by-100 mm square was cut out of the web and heated in an oven set at 190° C. for 30 minutes. After the heating, the residual dimensions were 74 mm in the longitudinal direction (percent shrinkage: 26%) and 81 mm in the crosswise direction (percent shrinkage: 19%.

Therefore, the ratio of a residual rate in the longitudinal direction to that in the crosswise direction (hereinafter referred to as RD ratio) was 0.91. The sheet had a surface resistivity of $10^{11}$ Ω and an index of wettability of 32 dyne/cm.

The rolled up sheet as above obtained was unrolled and sent to a pair of adjacent hot rolls at 150° C. in the S-shape with respect to the surfaces of the hot rolls. Thereafter, the both surfaces of the sheet were successively contacted and heated, followed by sending to a pair of adjacent chill rolls in the S-shape with respect to the surfaces of the chill rolls. Then, the both surfaces of the sheet were contacted and chilled and simultaneously taken up while applying a tension. By this hot-rolling, deformation of the sheet, such as curling, was corrected and the foamed sheet was leveled to have a uniform thickness of 0.72 mm. After the hot-rolling, both sides of the sheet were subjected to corona discharge treatment to improve printability, and the sheet was then cut to 650 mm in width and 950 mm in length. The density of the resulting sheet was 0.72 g/cm³ and a flatness of not more than 2 mm per m. The flatness could be determined by placing the sheet on a flat plate and measuring a maximum height of the wave per m (hereinafter the same).

A 100 mm square was cut out of the above-obtained cut-to-size sheet and heated in an oven at 190° C. for 30 minutes. After the heating, the residual dimension in the longitudinal direction was 71 mm (percent shrinkage: 29%) and that in the crosswise direction was 83 mm (percent shrinkage: 17%), with the RD ratio being 0.86. The index of wettability was 46 dyne/cm.

EXAMPLE 2

A polypropylene foamed sheet was produced in the same manner as in Example 1, except for using no antistatic agent.

The web of the foamed sheet taken up in the form of roll had a thickness of 0.73 mm, a width of 750 mm, a density of 0.72 g/cm³, and a surface resistivity of $10^{17}$ Ω.

When a 100 mm square cut out of the web was heated in the same manner as in Example 1, the residual dimension in the longitudinal direction was 79 mm (percent shrinkage: 21%) and that in the crosswise direction was 84 mm (percent shrinkage: 16%), with the RD ratio being 0.94.

The sheet was hot-rolled for flattening, subjected to corona discharge treatment, and cut to size (width: 640 mm; length: 950 mm) in the same manner as in Example 1 to obtain a sheet having a thickness of 0.72 mm, a density of 0.74 g/cm³, an index of wettability of 44 dyne/cm, and a flatness of 2 mm/m or less.

When a 100 mm square cut out of the cut-to-size sheet was heated in the same manner as in Example 1, the residual dimension in the longitudinal direction was 74 mm (percent shrinkage: 26%) and that in the crosswise direction was 85 mm (percent shrinkage: 15%), with the RD ratio being 0.87.

EXAMPLE 3

A mixture of 50 parts of a polypropylene resin ("Noblen AD 571" produced by Sumitomo Chemical), 20 parts of a high density polyethylene resin ("Yukalon HD JX-10" produced by Mitsubishi Petrochemical Co., Ltd.), and 30 parts of calcium carbonate having an average particle size of 4.5 μm ("Sunlight #700" produced by Takehara Kagaku Co., Ltd.) was kneaded and pelletized in an extruder. The pellets were processed in the same manner as in Example 1 to obtain a web of resin foamed sheet in the form of roll.

The foamed sheet had a thickness of 0.80 mm, a web width of 750 mm, a density of 0.70 g/cm³, a surface resistivity of $10^{11}$ Ω, and an index of wettability of 32 dyne/cm.

When a 100 mm square cut out of the web was heated in the same manner as in Example 1, the residual dimension in the longitudinal direction was 76 mm (percent shrinkage: 24%) and that in the crosswise direction was 88 mm (percent shrinkage: 12%), with the RD ratio being 0.86.

EXAMPLE 4

A polypropylene resin foamed sheet was produced in the same manner as in Example 1, except that the resin to talc weight ratio was changed to 80:20, the butane used as a blowing agent was replaced with 1 part of a mixture of sodium hydrogencarbonate and citric acid ("Dai Blow #2" produced by Dainichiseka Colour & Chemical Mfg. Co., Ltd.), and the antistatic agent was not fed to the extruder.

The resulting web of foamed sheet taken up in the form of roll had a thickness of 1.10 mm, a width of 750 mm, a density of 0.50 g/cm³, and a surface resistivity of $10^{16}$ Ω.

After the heat shrinkage in the same manner as in Example 1, the residual dimension in the longitudinal direction was 75 mm (percent shrinkage: 25%) and that in the crosswise direction was 90 mm (percent shrinkage: 10%), with the RD ratio being 0.83.

The rolled web was unrolled, and an aqueous solution of an antistatic agent ("Hostastat HS-1" produced by Hoechst) was coated thinly on both sides of the web. Then, the sheet was hot-rolled, subjected to corona discharge treatment to impart printability, and cut to size (width: 650 mm; length: 950 mm) in the same manner as in Example 1. The cut-to-size sheet had a thickness of 1.0 mm, a density of 0.52 g/cm³, a flatness of 2 mm/m or less, a surface resistivity of $10^{12}$ Ω, and an index of wettability of 44 dyne/cm.

When a 100 mm square cut out of the cut-to-size sheet was heated in the same manner as in Example 1, the residual dimension in the longitudinal direction was 73 mm (percent shrinkage: 27%) and that in the crosswise direction was 91 mm (percent shrinkage: 9%), with the RD ratio being 0.80.

EXAMPLE 5

A propylene resin foamed sheet was produced in the same manner as in Example 4, except for changing the polypropylene resin to talc weight ratio to 60:40.

The resulting web of foamed sheet had a thickness of 1.10 mm, a width of 750 mm, a density of 0.61 g/cm³, and a surface resistivity of $10^{16}$ Ω.

When a 100 mm square cut out of the web was heated in the same manner as in Example 1, the residual dimension in the longitudinal direction was 74 mm (percent shrinkage: 26%) and that in the crosswise direction was 78 mm (percent shrinkage: 22%), with the RD ratio being 0.95.

The web was coated with an antistatic agent, subjected to corona discharge treatment, and cut to size (width: 650 mm; length: 950 mm) in the same manner as in Example 4 to prepare sheets having a thickness of 1.0 mm, a density of 0.65 g/cm³, a flatness of 2 mm/m or less, a surface resistivity of $10^{10}$ Ω, and an index of wettability of 44 dyne/cm.

When a 100 mm square cut out of the sheet was heated in the same manner as in Example 1, the residual dimension in the longitudinal direction was 70 mm (percent shrinkage: 30%) and that in the crosswise direction was 80 mm (percent shrinkage: 20%), with the RD ratio being 0.87.

EXAMPLE 6

A mixture of 70 parts of a polypropylene resin (base resin of "Noblen D501"), 0.1 part of a stabilizer ("BHT"), and 30 parts of talc having an average particle size of 8 μm was pelletized in an extruder.

A hundred parts of the pellets were fed to an extruder having a cylinder diameter of 90 mm fitted with a ring die having a diameter of 180 mm and an orifice width of 0.50 mm, and extruded and foamed in the vertical direction. The cylinder temperature was set at 200° to 240° C., and about 0.5 part of butane was introduced to the midway of the cylinder under pressure. The compounded resin was extruded from the ring orifice and foamed at a resin temperature of 220° C. and a die temperature controlled lower than the resin temperature by about 10° C. The extrusion output was 80 kg/hr. The outer side of the extruded and foamed tubular sheet was cooled with a light wind (1.0 kg/cm$^2$ or less) blown from an air ring provided concentrically with the ring die and at a distance within 20 mm from the die.

The tubular sheet was taken off while cooling along a cylindrical drum which comprised a first (front) cylinder having a front diameter of 455 mm, a rear diameter of 454 mm, and a length of 70 mm and a second (rear) cylinder having a front diameter of 450 mm, a rear diameter of 448 mm, and a length of 430 mm which were connected vertically with a small gap therebetween. The blow-up ratio was 2.53. The cooling temperature of the first cylinder was set higher than that of the second cylinder by about 30° C. so as to lessen the resistance of the tubular sheet to the drum. The tubular sheet was cut in two halves along the extrusion direction with two cutters fitted to the rear end of the second cylinder to obtain two webs, each of which was separately taken up in the form of roll. When a compounding ratio of an inorganic fine powder, e.g., talc, is high as in this example, it is very difficult to introduce the extruded tubular sheet to the cooled cylindrical drum. Such being the case, the resin compound can be extruded to the downward direction as in the case of this example to relatively facilitate the introduction to the drum.

The resulting web of foamed sheet had a thickness of 0.73 mm, a width of 700 mm, a density of 0.81 g/cm$^3$, a surface resistivity of $10^{16}$ Ω, and an index of wettability of 32 dyne/cm. When a 100 mm square cut out of the web was heated in the same manner as in Example 1, the residual dimension in the longitudinal direction was 85 mm (percent shrinkage: 15%) and that in the crosswise direction was 87 mm (percent shrinkage: 13%), with the RD ratio being 0.98.

The web was unrolled and passed through a pair of hot rolls at 150° C., cooled under tension, and taken up to obtain a flattened sheet. In the course of take-up, the both sides of the web were subjected to corona discharge treatment, and an aqueous solution of an antistatic agent ("SAT-5" produced by Nippon Junyaku Co., Ltd.) was atomized and sprayed onto the sheet to form a thin antistatic layer, followed by drying at about 80° C. The thus-processed web was cut to 650 mm in width and 950 mm in length to obtain sheets having a thickness of 0.72 mm, a density of 0.83 g/cm$^3$, a flatness of 2 mm/m, a surface resistivity of $10^{10}$ Ω, and an index of wettability of 48 dyne/cm.

When a 100 mm square cut out of the sheet was heated in the same manner as in Example 1, the residual dimension in the longitudinal direction was 84 mm (percent shrinkage: 16%) and that in the crosswise direction was 87 mm (percent shrinkage: 13%), with the RD ratio being 0.97.

EXAMPLE 7

A polypropylene foamed sheet was produced in the same manner as in Example 6, except for using an extruder fitted with a ring die having a diameter of 180 mm and an orifice width of 0.35 mm.

The resulting web of foamed sheet in the form of roll had a thickness of 0.48 mm, a width of 700 mm, a density of 0.43 g/cm$^3$, a surface resistivity of $10^{16}$ Ω, and an index of wettability of 32 dyne/cm.

When a 100 mm square cut out of the web was heated in the same manner as in Example 1, the residual dimension in the longitudinal direction was 80 mm (percent shrinkage: 20%) and that in the crosswise direction was 88 mm (percent shrinkage: 12%), with the RD ratio being 0.91.

The web was unrolled, hot-rolled, subjected to corona discharge treatment, coated with an antistatic agent, and cut to size (width: 650 mm; length: 950 mm) to obtain sheets having a thickness of 0.46 mm, a density of 0.46 g/cm$^3$, a flatness of 1 mm/m or less, a surface resistivity of $10^{10}$ Ω, and an index of wettability of 49 dyne/cm.

When a 100 mm square cut out of the sheet was heated in the same manner as in Example 1, the residual dimension in the longitudinal direction was 78 mm (percent shrinkage: 22%), and that in the crosswise direction was 84 mm (percent shrinkage: 16%), with the RD ratio being 0.93.

COMPARATIVE EXAMPLE 1

A polypropylene resin foamed sheet was produced in the same manner as in Example 1, except for using a single cylindrical drum having a diameter of 200 mm and a length of 300 mm for cooling and taking off. The blow-up ratio was 1.90.

The resulting web had a thickness of 0.73 mm, a width of 620 mm, a density of 0.71 g/cm$^3$, a surface resistivity of $10^{11}$ Ω, and an index of wettability of 32 dyne/cm.

When a 100 mm square cut out of the web was heated in the same manner as in Example 1, the residual dimension in the longitudinal direction was 52 mm (percent shrinkage: 48%) and that in the crosswise direction was 82 mm (percent shrinkage: 18%), with the RD ratio being 0.63.

COMPARATIVE EXAMPLE 2

A polypropylene resin foamed sheet was produced in the same manner as in Example 6, except that a first cylinder having a front diameter of 340 mm, a rear diameter of 339 mm, and a length of 70 mm and a second cylinder having a front diameter of 335 mm, a rear diameter of 333 mm, and a length of 430 mm connected with a small gap therebetween were used for taking off and cooling and that the tubular sheet was cut open along the extrusion direction by means of a single cutter fitted to the rear end of the second cylinder. The blow-up ratio was 1.89.

The resulting web of foamed resin sheet had a thickness of 0.70 mm, a width of 1,050 mm, a density of 0.77 g/cm$^3$, a surface resistivity of 10$^{16}$ Ω, and an index of wettability of 32 dyne/cm. When a 100 mm square cut out of the web was heated in the same manner as in Example 1, the residual dimension in the longitudinal direction was 52 mm (percent shrinkage: 48%) and that in the crosswise direction was 86 mm (percent shrinkage: 14%), with the RD ratio being 0.60.

The composition of each of the resin foamed sheets produced in the foregoing examples and the apparatus and conditions for extrusion are summarized in Table 1 below. The dimensions and various properties of each of the extruded foamed sheets in the form of roll and the cut-to-size sheets produced in the foregoing examples are shown in Table 2 below.

In order to evaluate formability of the polypropylene resin foamed sheet of the present invention, each of the cut-to-size sheets prepared in the foregoing Examples and Comparative Examples was tested as follows.

Figure 1:
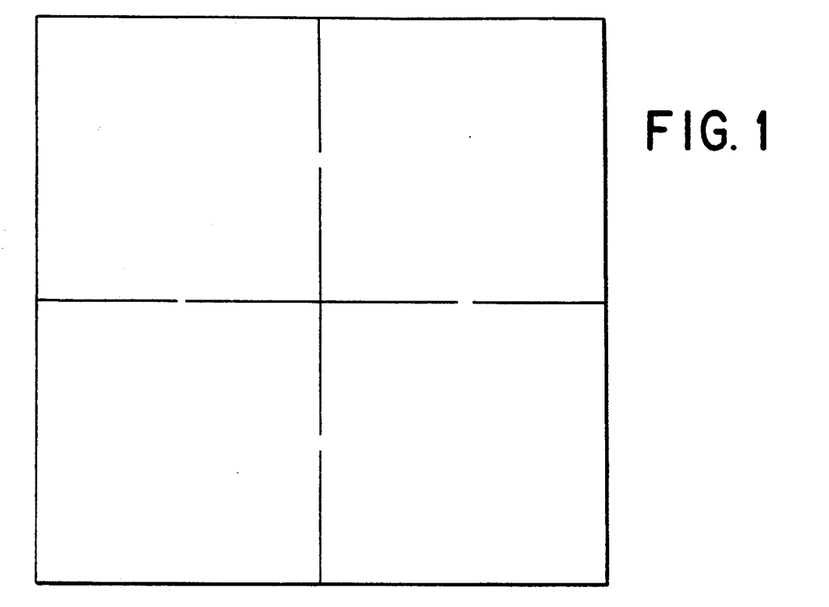
FIG. 1 is a plan view of the polypropylene resin foamed sheet obtained in Examples and Comparative Examples.

A 200 mm square sheet (FIG. 1) was cut out of the sheet by means of a rotary sheeting machine, and a pattern comprising two straight 150 mm long lines crossing with each other at right angles was printed on the surface of the sheet, the intersection of the two lines being at the center of the sheet and each line being parallel to the side of the square.

Figures 2A, 2B:
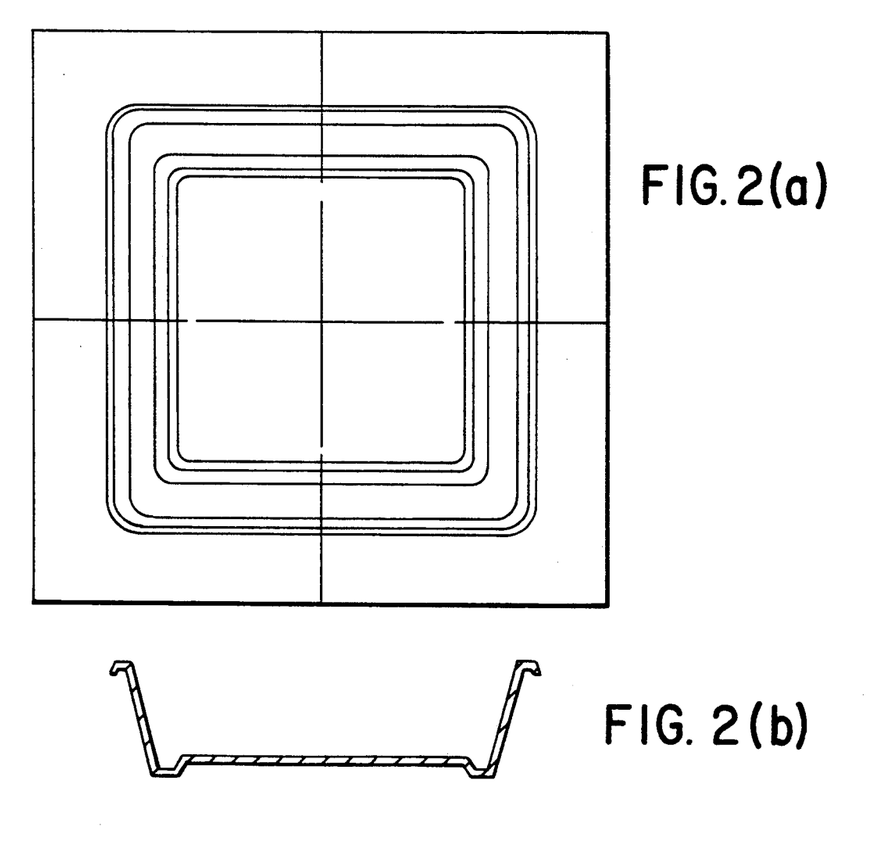
FIG. 2(a) is a plan view of a container obtained by thermoforming of the foamed sheet of FIG. 1.
FIG. 2(b) is a cross-sectional view of said container having been trimmed.

The patterned sheet was thermoformed by contact with a hot plate (area to contact with sheet: 170 mm × 170 mm) set at a temperature of 170° C., 180° C., or 190° C. for 6 seconds to obtain a container having a width of 150 mm, a length of 150 mm, and a depth of 20 mm as illustrated in FIGS. 2(a) and 2(b).

The distortion of the pattern caused by thermoforming was examined by measuring a deviation (mm) of each end of each line on the bottom or side wall of the formed container from the respective imaginary straight line, and the greatest measured value as to the bottom or side wall was assigned to the following rating system:

Good: Within 0.5 mm
Medium: Within 1.0 mm
Poor: More than 1.0 mm

Further, the formed container was checked for appearance by visually examining cracks, forming defects due to breakage, extreme local variation of thickness, and wrinkles or overlaps, and the container passing all these checks was rated "good", the one failing to pass any one of these checks was rated "medium", and the one failing to pass all of the checks was rated "bad".

The results of these evaluations are shown in Table 3 below.

TABLE 1

| | Example | | | | | | | Comparative Example | |
|---|---|---|---|---|---|---|---|---|---|
| | 1 | 2 | 3 | 4 | 5 | 6 | 7 | 1 | 2 |
| Composition (part): | | | | | | | | | |
| Polypropylene Resin | Noblen D 501 base resin (70) | Noblen D 501 base resin (70) | Noblen AD 571 (50) | Noblen D 501 base resin | Noblen D 501 base resin (60) | Noblen D 501 base resin (70) | Noblen D 501 base resin (70) | Noblen D 501 base resin (70) | Noblen D 501 base resin (70) |
| High Density Polyethylene Resin | — | — | Yukalon HD JX-10 (20) | — | — | — | — | — | — |
| Inorganic Fine Powder | talc (average particle size: 8 μm) (30) | talc (average particle size: 8 μm) (30) | Sunlight #700 (4.5 μm) (30) | talc (8 μm) (20) | talc (8 μm) (40) | talc (8 μm) (30) | talc (8 μm) (30) | talc (8 μm) (30) | talc (8 μm) (30) |
| Stabilizer | BHT (0.1) | BHT (0.1) | — | BHT (0.1) | BHT (0.1) | BHT (0.1) | BHT (0.1) | BHT (0.1) | BHT (0.1) |
| Blowing Agent* | butane (ca. 0.5) | butane (ca. 0.5) | butane (ca. 0.5) | Dai Blow #2 #2 (1.0) | Dai Blow (1.0) | butane (ca. 0.5) | butane (ca. 0.5) | butane (ca. 0.5) | butane (ca. 0.5) |
| Antistatic Agent | Electro-stripper TS-2 (1) | — | Electro-stripper TS-2 (1) | — | — | — | — | Electro-stripper TS-2 (1) | — |
| Extrusion Condition: | | | | | | | | | |
| Direction | Horizontal | Horizontal | Horizontal | Horizontal | Horizontal | downward | downward | horizontal | downward |
| Cylinder Diameter (mm) | 65 | 65 | 65 | 65 | 65 | 90 | 90 | 65 | 90 |
| Ring Die Diameter (mm) | 105 | 105 | 105 | 105 | 105 | 180 | 180 | 105 | 180 |
| Orifice Width (mm) | 0.45 | 0.45 | 0.45 | 0.45 | 0.45 | 0.50 | 0.35 | 0.45 | 0.50 |
| First Drum: | | | | | | | | | |
| Front Diameter (mm) | 240 | 240 | 240 | 240 | 240 | 455 | 455 | 200 | 340 |
| Rear Diameter (mm) | 239 | 239 | 239 | 239 | 239 | 454 | 454 | 200 | 339 |
| Length (mm) | 50 | 50 | 50 | 50 | 50 | 70 | 70 | 300 | 70 |
| Second Drum: | | | | | | | | | |
| Front Diameter (mm) | 235 | 235 | 235 | 235 | 235 | 450 | 450 | — | 335 |
| Rear Diameter (mm) | 234 | 234 | 234 | 234 | 234 | 448 | 448 | — | 333 |
| Length (mm) | 300 | 300 | 300 | 300 | 300 | 430 | 430 | — | 430 |
| Blow-Up Ratio | 2.29 | 2.29 | 2.29 | 2.29 | 2.29 | 2.53 | 2.53 | 1.90 | 1.89 |
| Cylinder Temp. (°C.) | 200–230 | 200–230 | 200–230 | 200–230 | 200–230 | 200–240 | 200–240 | 200–230 | 200–240 |
| Resin Temp. | 200 | 200 | 200 | 200 | 200 | 220 | 220 | 200 | 220 |

TABLE 1-continued

| | Example | | | | | | | Comparative Example | |
|---|---|---|---|---|---|---|---|---|---|
| | 1 | 2 | 3 | 4 | 5 | 6 | 7 | 1 | 2 |
| (°C.) | | | | | | | | | |
| Output (kg/hr) | 25 | 25 | 25 | 25 | 25 | 80 | 80 | 25 | 80 |

Note:
*Unit: Parts per 100 parts of the resin

TABLE 2

| | Example | | | | | | | Comparative Example | |
|---|---|---|---|---|---|---|---|---|---|
| | 1 | 2 | 3 | 4 | 5 | 6 | 7 | 1 | 2 |
| Extruded Sheet (roll) | | | | | | | | | |
| Dimension: | | | | | | | | | |
| Thickness (mm) | 0.74 | 0.73 | 0.80 | 1.10 | 1.10 | 0.73 | 0.48 | 0.73 | 0.70 |
| Width (mm) | 750 | 750 | 750 | 750 | 750 | 700 | 700 | 620 | 1,050 |
| Density (g/cm$^3$) | 0.73 | 0.72 | 0.70 | 0.50 | 0.61 | 0.81 | 0.43 | 0.71 | 0.77 |
| Dimensional Change on Heating: | | | | | | | | | |
| RD Dimension* (mm) | L: 74 C: 81 | L: 79 C: 84 | L: 76 C: 88 | L: 75 C: 90 | L: 74 C: 78 | L: 85 C: 87 | L: 80 C: 88 | L: 52 C: 82 | L: 52 C: 86 |
| Percent Shrinkage (%) | L: 26 C: 19 | L: 21 C: 16 | L: 24 C: 12 | L: 25 C: 10 | L: 26 C: 22 | L: 15 C: 13 | L: 20 C: 12 | L: 48 C: 18 | L: 48 C: 14 |
| RD Ratio** | 0.91 | 0.94 | 0.86 | 0.83 | 0.95 | 0.98 | 0.91 | 0.63 | 0.60 |
| Surface Resistivity (Ω) | $10^{11}$ | $10^{17}$ | $10^{11}$ | $10^{16}$ | $10^{16}$ | — | $10^{16}$ | $10^{11}$ | $10^{16}$ |
| Index Wettability (dyne/cm) | 32 | — | 32 | — | — | — | 32 | 32 | 32 |
| Post-Processed Sheet (cut-to-size) | | | | | | | | | |
| Antistatic Agent | — | — | — | Hostastat HS-1 | Hostastat HS-1 | SAT-5 | SAT-5 | — | — |
| Hot Roll Temperature (°C.) | 150 | 150 | — | 150 | 150 | 150 | 150 | — | — |
| Corona Discharge Treatment | done | done | — | done | done | done | done | — | — |
| Dimension: | | | | | | | | | |
| Thickness (mm) | 0.72 | 0.72 | | 1.00 | 1.00 | 0.72 | 0.46 | | |
| Width (mm) | 650 | 650 | | 650 | 650 | 650 | 650 | | |
| Length (mm) | 950 | 950 | | 950 | 950 | 950 | 950 | | |
| Density (g/cm$^3$) | 0.72 | 0.74 | | 0.52 | 0.65 | 0.83 | 0.46 | | |
| Flatness (mm/m) | 2 or less | 2 or less | | 2 or less | 1 or less | 2 or less | 1 or less | | |
| Dimensional Change on Heating: | | | | | | | | | |
| RD Dimension* (mm) | L: 71 C: 83 | L: 74 C: 85 | | L: 73 C: 91 | L: 70 C: 80 | L: 84 C: 87 | L: 78 C: 84 | | |
| Percent Shrinkage (%) | L: 29 C: 17 | L: 26 C: 15 | | L: 27 C: 9 | L: 30 C: 20 | L: 16 C: 13 | L: 22 C: 16 | | |
| RD Ratio** | 0.86 | 0.87 | | 0.80 | 0.87 | 0.97 | 0.93 | | |
| Surface Resistivity (Ω) | — | — | | $10^{12}$ | $10^{10}$ | $10^{10}$ | $10^{16}$ | | |
| Index of Wettability (dyne/cm) | 46 | 44 | | 44 | 44 | 48 | 49 | | |

Note:
*RD Dimension: Residual dimension
L: Longitudinal direction
C: Crosswise direction
**RD Ratio: Ratio of residual rate in the longitudinal direction to that in the crosswise direction

TABLE 3

| | Example | | | | | | | Comparative Example | |
|---|---|---|---|---|---|---|---|---|---|
| | 1 | 2 | 3 | 4 | 5 | 6 | 7 | 1 | 2 |
| Pattern Distortion | | | | | | | | | |
| Bottom: | | | | | | | | | |
| 170° C.: | | | | | | | | | |
| L* | good | good | medium | good | good | good | medium | medium | medium |
| C* | good | good | good | medium | good | good | good | medium | poor |
| 180° C.: | | | | | | | | | |
| L | good | good | good | good | good | good | good | medium | medium |
| C | good | good | good | good | good | good | good | poor | poor |
| 190° C.: | | | | | | | | | |
| L | medium | good | good | medium | good | good | medium | medium | poor |
| C | good | good | good | good | good | good | good | poor | poor |
| Wide Wall: | | | | | | | | | |
| 170° C.: | | | | | | | | | |
| L | good | good | good | good | good | good | good | poor | medium |
| C | good | good | good | good | good | good | good | poor | poor |
| 180° C.: | | | | | | | | | |
| L | good | good | good | good | good | good | good | medium | medium |
| C | good | good | good | good | good | good | good | poor | poor |

TABLE 3-continued

| | Example | | | | | | | Comparative Example | |
|---|---|---|---|---|---|---|---|---|---|
| | 1 | 2 | 3 | 4 | 5 | 6 | 7 | 1 | 2 |
| 190° C.: | | | | | | | | | |
| L | medium | good | medium | medium | good | good | medium | poor | poor |
| C | good | good | good | good | good | good | medium | poor | poor |
| Appearance | good | good | good | good | good | good | good | bad | bad |

Note:
L: Longitudinal direction,
C: Crosswise direction

It can be seen from Table 3 that positional deviation of the printed pattern on thermoforming can be controlled within 0.5 mm in almost all of the formed containers obtained from the foamed sheet of the present invention whereas the comparative formed containers suffer from a positional deviation of the printed pattern of more than 1.0 mm.

Figures 3A, 3B, 3C:
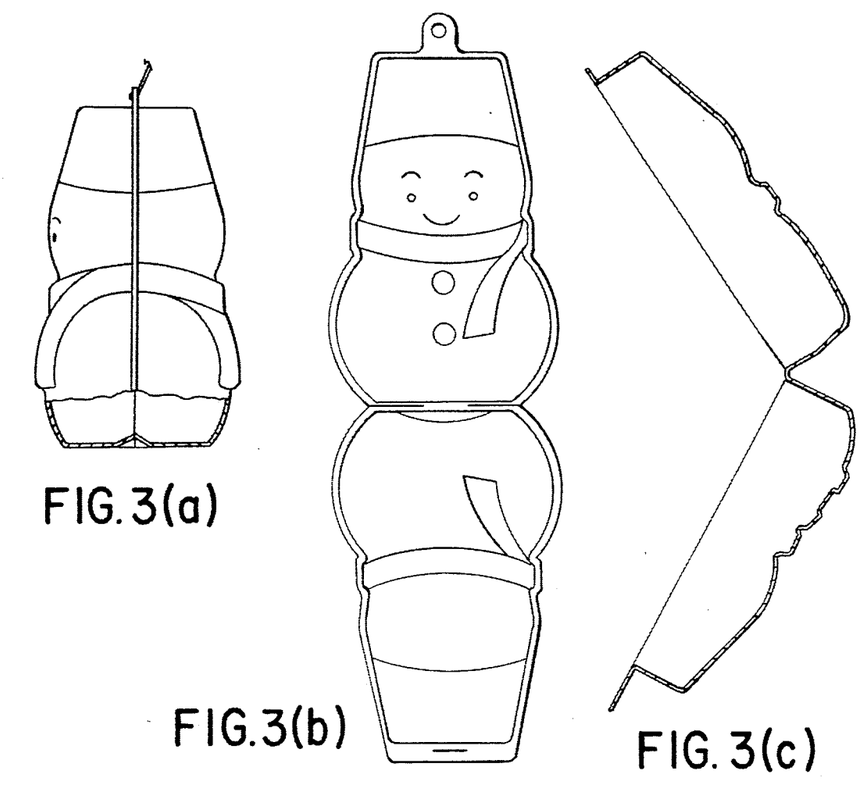
Figure 3D:
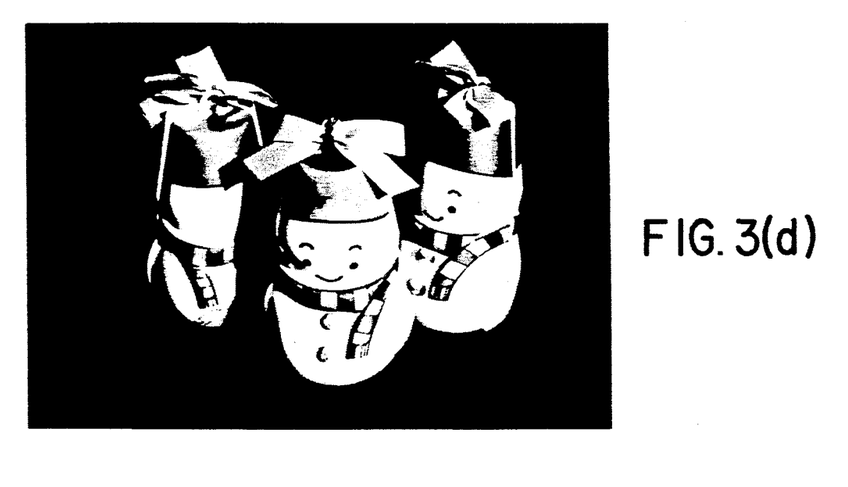
Figures 4A, 4B:
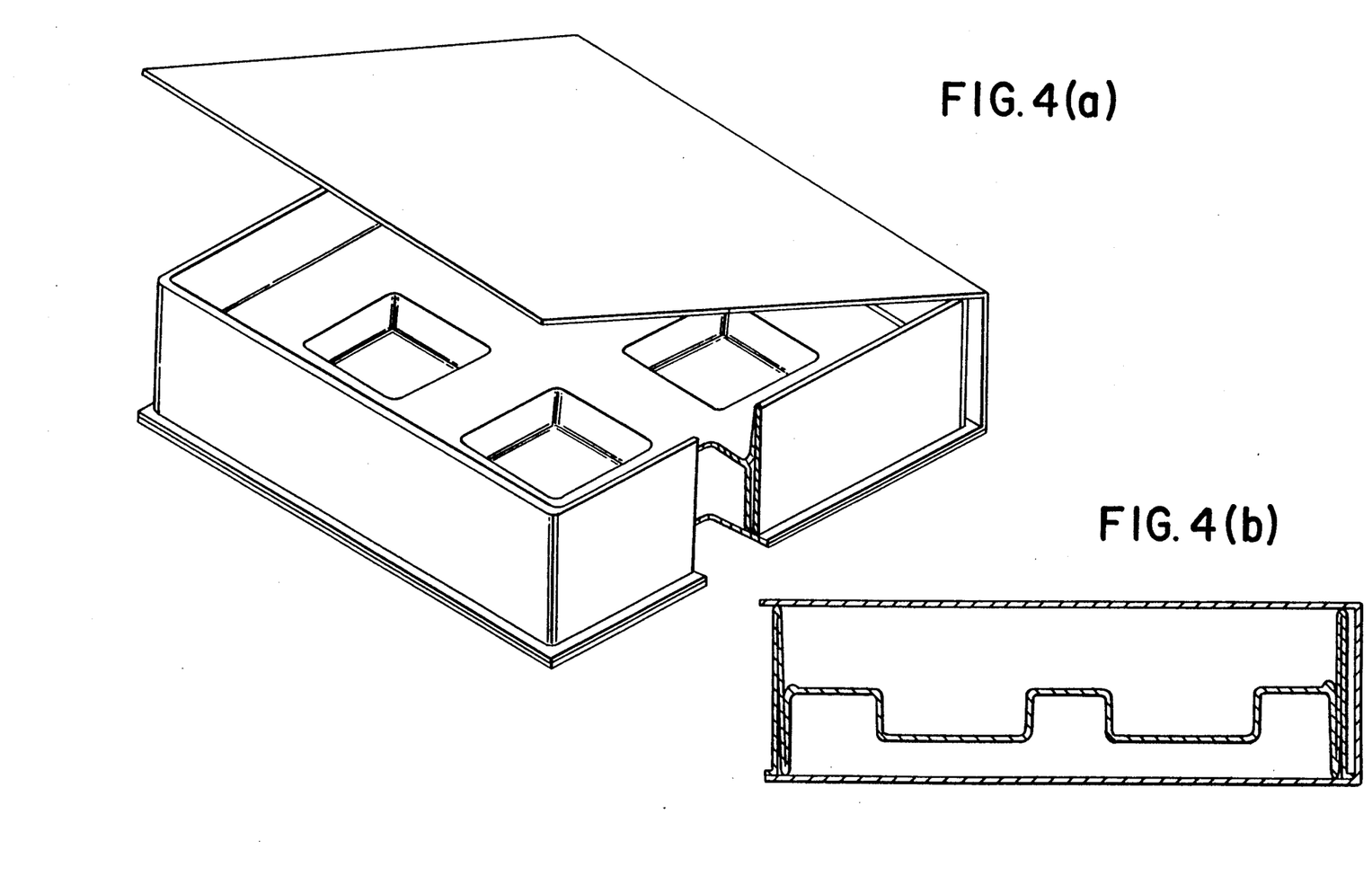

Additional examples of formed articles which were obtained from the polypropylene resin foamed sheet according to the present invention are illustrated in FIGS. 3(a), (b), (c) and (d) and FIGS. 4(a) and (b).

The article of FIGS. 3 is composed of two symmetrical parts connected via a hinge and is bent double at the hinge to make a doll-shaped packaging container suitable for candies, etc. As can be seen from these figures, the unevenness of the formed sheet is in good agreement with the pattern of a roll printed on the foamed sheet, as shown in a photograph of FIG. 3(d).

The article of FIG. 4 is a lidded packaging container having a turned side wall. It can be seen that the resin foamed sheet of the present invention is capable of deep draw at a high draw ratio.

EXAMPLE 8

A mixture of 70 parts of a polypropylene resin (base resin of "Noblen D 501"), 0.1 part of a stabilizer ("BHT"), and 30 parts of talc having an average particle size of 8 μm was pelletized in an extruder. A hundred parts of the pellets were used as a starting material of foamed product and fed to an extruder having a cylinder diameter of 90 mm.

Separately, a polypropylene resin ("Noblen FS2011D" produced by Sumitomo Chemical Co., Ltd.) was used as a starting material of film. This starting material of film was fed to two extruders having a cylinder diameter of 50 mm and 45 mm, respectively, and the extrudates were combined with the extrudate from the former extruder having a cylinder diameter of 90 mm, followed by coextrusion to produce a laminated foamed sheet in which the film layers were laminated on the both surfaces of the foamed product. At this time, the extruder used was fitted with a ring die having a diameter of 180 mm and an orifice width of 0.50 mm at the tip thereof, and the coextrusion and blowing were performed downwardly.

Thereafter, the same procedures as in Example 6 were followed. The physical properties and moldability of the laminated foamed sheet are shown in Table 4.

TABLE 4

| Extruded Sheet (roll) | |
|---|---|
| Dimension (thickness): | |
| Film Layer (mm) | 0.046 |
| Foamed Layer (mm) | 0.72 |
| Film Layer (mm) | 0.044 |
| Total (mm) | 0.81 |
| Dimensional Change on Heating: | |
| RD Dimension* (mm) | L: 73 |
| | C: 85 |
| Percent Shrinkage (%) | L: 27 |
| | C: 15 |
| RD Ratio** | 0.86 |
| Surface Resistivity (Ω) | $10^{16}$ |
| Index of Wettability (dyne/cm) | 32 |
| Pattern Distortion | |
| Bottom: | |
| 170° C.: | |
| L | good |
| C | good |
| 180° C. | |
| L | good |
| C | good |
| 190° C.: | |
| L | medium |
| C | good |
| Side Wall: | |
| 170° C.: | |
| L | good |
| C | good |
| 180° C.: | |
| L | good |
| C | good |
| 190° C.: | |
| L | medium |
| C | good |
| Appearance | good |

Note:
* & **Same as in Table 2.

As described above, the polypropylene resin foamed sheet according to the present invention exhibits excellent thermoforming properties, and the process for production of the present invention makes it possible to increase a take-up speed and productivity by using a specifically designed cylindrical drum.

Thus, the resin foamed sheet of the invention, with a pattern formed thereon, can be formed to an article having a beautiful appearance free from pattern deviation and other defects and having a precisely formed complicated steric shape. Therefore, the sheet is suitable for producing containers for foodstuff, packaging containers, display panels having a three dimensional pattern, and the like.

While the invention has been described in detail and with reference to specific embodiments thereof, it will be apparent to one skilled in the art that various changes and modifications can be made therein without departing from the spirit and scope thereof.

What is claimed is:

1. A process for producing a foamed film, suitable for use in thermoforming, having a density of from 0.2 to 1.2 g/cm³, a thickness of 0.2 to 3 mm, and a percent shrinkage in each of the longitudinal and the crosswise directions of 5 to 30% upon being heated to 190° C. for 30 minutes, which process comprises substantially uniformly compounding a polypropylene resin with from 10 to 50% by weight of an inorganic fine powder and a blowing agent, extruding and foaming said compounded resin through a ring die of an extruder to form a tubular foam form film thereof; and taking off said extruded tubular foam form film over a cylindrical drum means having a diameter of 2 to 3 times the diameter of said ring die; which tubular foam form film is suitable for cutting to form a flat foam form film suitable for use in said thermoforming, wherein the diameter of said cylindrical drum means and the temperature thereof in combination are sufficient to limit the longitudinal stretching of said foam form tubular film relative to the crosswise stretching thereof such that upon heating a square sample thereof, having adjacent sides which are substantially parallel to said longitudinal and crosswise directions respectively, to 190° C. for 30 minutes sufficient to shrink such film, the shrunk film resulting from said square has a ratio of its residual dimensions in its longitudinal to its crosswise directions of 1:0.7 to 1:1.1.

2. A process as claimed in claim 1, wherein said cylindrical drum means comprises a front cylinder and a rear cylinder, having a diameter smaller than that of the front cylinder, with a small gap therebetween, and the cooling temperature of the front cylinder is higher than that of the rear cylinder.

3. A process as claimed in claim 1, wherein said process further includes cutting the tubular foamed film having been cooled along the cylindrical drum along the extrusion direction, contacting the film with a hot roll under tension, and cutting the film to size.

4. A process as claimed in claim 3 wherein the foamed film is sent to a pair of adjacent hot rolls in the S-shape with respect to the surfaces of the hot rolls, the both surfaces of the film are successively contacted and heated, and the film is taken up while cooling under tension.

5. A process of producing a film as claimed in claim 1 wherein said resin consists essentially of polypropylene.

* * * * *